US010701103B2

(12) United States Patent
Aggarwal et al.

(10) Patent No.: US 10,701,103 B2
(45) Date of Patent: Jun. 30, 2020

(54) SECURING DEVICES USING NETWORK TRAFFIC ANALYSIS AND SOFTWARE-DEFINED NETWORKING (SDN)

(71) Applicant: Dell Products, L.P., Round Rock, TX (US)

(72) Inventors: Chaitanya Aggarwal, Faridabad (IN); Prabhat Chandra Biswas, Bangalore (IN); Alok Ranjan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 186 days.

(21) Appl. No.: 15/435,268

(22) Filed: Feb. 16, 2017

(65) Prior Publication Data

US 2018/0234454 A1  Aug. 16, 2018

(51) Int. Cl.
*H04L 29/06* (2006.01)
*H04W 12/08* (2009.01)
*H04L 29/08* (2006.01)

(52) U.S. Cl.
CPC ...... *H04L 63/1458* (2013.01); *H04L 63/1425* (2013.01); *H04W 12/08* (2013.01); *H04L 67/12* (2013.01)

(58) Field of Classification Search
CPC . H04L 63/1458; H04L 63/1425; H04L 63/16; H04L 27/12; H04W 12/08
See application file for complete search history.

(56) References Cited

U.S. PATENT DOCUMENTS

| | | | | |
|---|---|---|---|---|
| 7,865,954 B1* | 1/2011 | Phoha | ............... | H04L 63/1466 709/224 |
| 2004/0003286 A1* | 1/2004 | Kaler | ............... | G06F 21/554 726/25 |
| 2013/0283374 A1* | 10/2013 | Zisapel | ............... | H04L 63/1408 726/22 |
| 2014/0325649 A1* | 10/2014 | Zhang | ............... | H04L 43/024 726/23 |
| 2015/0188949 A1* | 7/2015 | Mahaffey | ............... | H04L 63/20 726/1 |
| 2016/0218949 A1* | 7/2016 | Dasgupta | ............... | G06F 11/3466 |
| 2016/0285904 A1* | 9/2016 | Ye | ............... | H04W 12/1208 |
| 2018/0145902 A1* | 5/2018 | Grosso | ............... | H04L 47/2441 |

* cited by examiner

*Primary Examiner* — Khoi V Le
(74) *Attorney, Agent, or Firm* — Fogarty LLP

(57) ABSTRACT

Systems and methods for securing devices using traffic analysis and Software-Defined Networking (SDN). In some embodiments, an Information Handling System (IHS) may include a processor and a memory coupled to the processor, the memory including program instructions stored thereon that, upon execution by the processor, cause the IHS to: receive traffic in a Software-Defined Network (SDN) network; identify, based upon the received traffic, a security threat; and initiate a remediation measure with respect to the security threat.

12 Claims, 7 Drawing Sheets

SECURING DEVICES USING NETWORK TRAFFIC ANALYSIS AND SOFTWARE-DEFINED NETWORKING (SDN)

FIELD

The present disclosure generally relates to Information Handling Systems (IHSs), and, more particularly, to systems and methods for securing devices using traffic analysis and Software-Defined Networking (SDN).

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

The Internet-of-Things (IoT) is the internetworking of physical devices, buildings, vehicles, etc.—embedded with electronics, software, sensors, transducers, actuators, and network connectivity that enable them to collect and exchange data. In the current technological environment, IoT has turned "heterogeneous networks" into "super-heterogeneous networks" of disparate IHSs and smart devices ("IoT devices"). Therefore, securing such a network has become a very complex task. There are different methods of providing security in an IoT network, but none is infallible.

SUMMARY

Embodiments of systems and methods for securing devices using traffic analysis and Software-Defined Networking (SDN) are described. In an illustrative, non-limiting embodiment, an Information Handling System (IHS) comprises one or more processors and a memory coupled to the one or more processors, the memory including program instructions stored thereon that, upon execution by the one or more processors, cause the IHS to: receive traffic in a Software-Defined Network (SDN) network; identify, based upon the received traffic, a security threat; and initiate a remediation measure with respect to the security threat.

In some cases, at least a portion of the traffic may be directed to or originated from an of Internet-of-Things (IoT) device, the IoT device may lack one or more capabilities necessary for identifying or remediating the security threat, and the capabilities may be selected from the group consisting of: processing power, memory space, and security software. In some cases, an IoT device may include an analog sensor coupled to the SDN network via an adaptor or hub and the plurality of requests may include requests for the adaptor or hub to transmit, to the server, an indication of an analog voltage or current signal read by the analog sensor.

Receiving the traffic may include receiving Transmission Control Protocol (TCP) data from an SDN-capable switch or router.

The security threat may include a Denial-of-Service (DoS) attack. For example, the DoS threat may include a Slow DoS attack whereby a plurality of requests are left open at the same time and occupy all available connections permitted by a server.

Moreover, identifying the security threat may include determining, for a given request, that a response time is greater than a first threshold value. Additionally or alternatively, identifying the security threat may include determining, for a given request, that a resource of the server is used to a degree greater than a second threshold value.

The remediation measure may include Internet Protocol (IP) blocking, port blocking, or traffic rate limiting. Moreover, initiating the remediation measure may include updating one or more entries in a flow table used by the SDN-capable switch or router. Updating the one or more entries in the flow table may include using a representational state transfer (REST) Application Programming Interface (API). The program instructions, upon execution, may cause the IHS to receive a definition of the security threat from a main IoT Gateway Controller in the SDN network.

In another illustrative, non-limiting embodiment, a hardware memory device may have program instructions stored thereon that, upon execution by an Information Handling System (IHS), cause the IHS to: receive traffic in a Software-Defined Network (SDN) network, wherein at least a portion of the traffic is directed to or originated from an of Internet-of-Things (IoT) device, wherein the IoT device lacks one or more capabilities necessary for identifying the security threat, and wherein the capabilities are selected from the group consisting of: processing power, memory space, and security software; identify, based upon the received traffic, a security threat; and initiate a remediation measure with respect to the security threat.

In some cases, receiving the traffic may include receiving Transmission Control Protocol (TCP) data from an SDN-capable switch or router. The security threat may include a Slow DoS attack whereby a plurality of requests are left open at the same time and occupy all available connections permitted by the IoT device. Identifying the security threat may include determining, for a given request, that a response time of the IoT device is greater than a first threshold value, and determining, for the given request, that a resource of the IoT device is used to a degree greater than a second threshold value. Additionally or alternatively, initiating the remediation measure may include updating one or more entries in a flow table used by the SDN-capable switch or router.

In yet another illustrative, non-limiting embodiment, a method may include receiving Transmission Control Protocol (TCP) data in a Software-Defined Network (SDN) network from an SDN-capable switch or router, wherein at least a portion of the traffic is directed to a server and originated from an of Internet-of-Things (IoT) device; identifying, based upon the received traffic, a security threat; and initiating a remediation measure with respect to the security threat.

For example, the security threat may include a Slow DoS attack whereby a plurality of requests are left open at the same time and occupy all available connections permitted by the server, wherein identifying the security threat further comprises determining, for a given request, that a response time of the server is greater than a first threshold value, and determining, for a given request, that a resource of the IoT device is used to a degree greater than a second threshold value. Additionally or alternatively, initiating the remediation measure may include updating one or more entries in a flow table used by the SDN-capable switch or router.

In another illustrative, non-limiting embodiment, a method may implement one or more of the aforementioned operations. In yet another illustrative, non-limiting embodiment, a memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
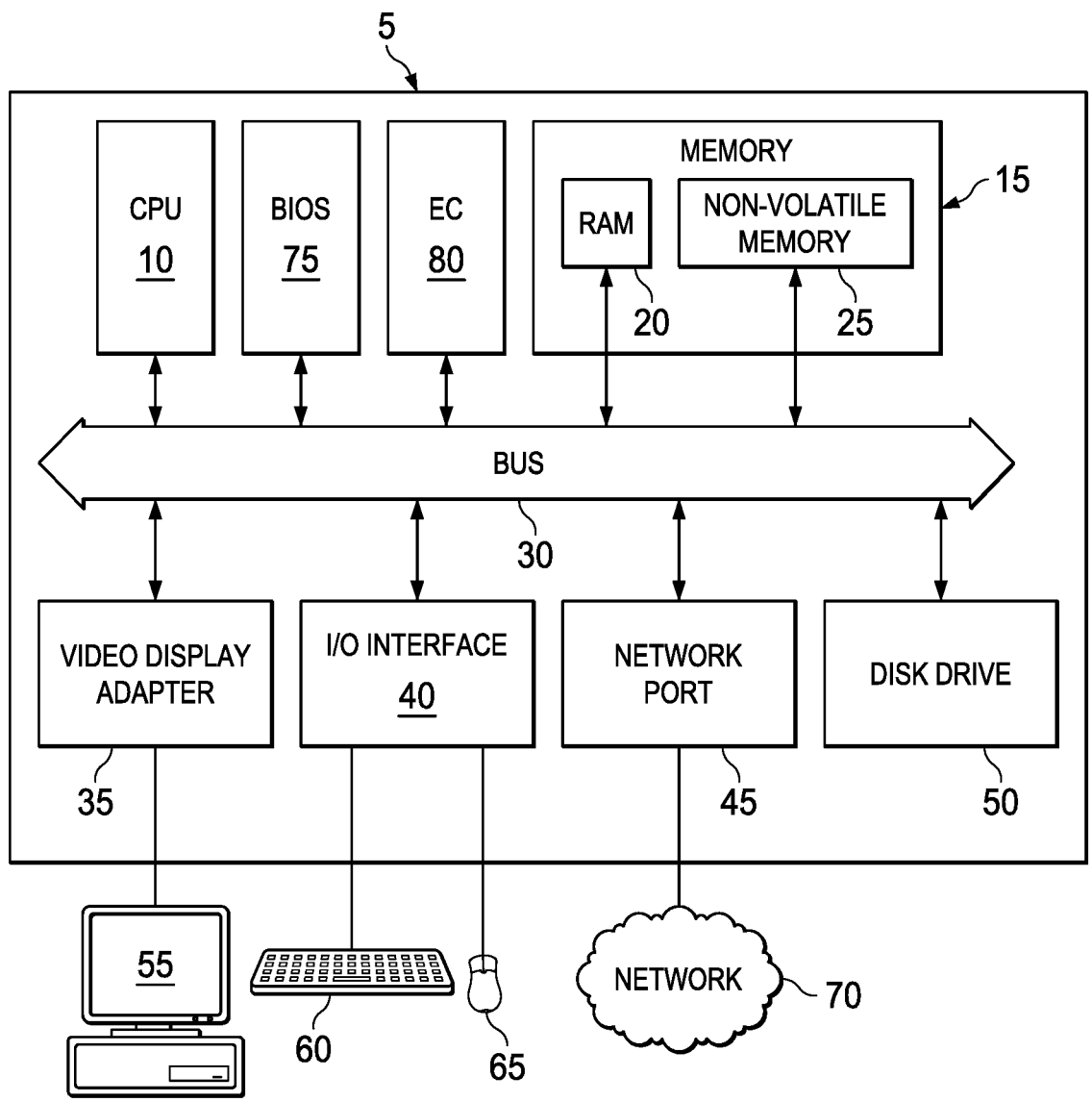
FIG. 1 is a diagram of an example of an Information Handling System (IHS) configured to implement an Internet-of-Things (IoT) Gateway Controller according to some embodiments.

Software-defined networking (SDN) is an intelligent networking paradigm that can rapidly and automatically reconfigure network devices, reroute traffic, and apply authentication and access rules can open up a way for better security and access control mechanisms. Particularly, SDN is an approach to computer networking that allows network administrators to manage network services through abstraction of lower-level functionality, by decoupling or disassociating a system that makes decisions about where traffic is sent (control plane) from underlying systems that forward traffic to a destination (data plane).

Architectural components of an SDN include an SDN application, an SDN Controller, an SDN Datapath, an SDN Control to Data-Plane Interface (CDPI), and SDN Northbound Interfaces (NBI).

SDN Applications are programs that explicitly, directly, and programmatically communicate their network requirements and desired network behavior to the SDN Controller via a northbound interface (NBI). They may consume an abstracted view of the network for their internal decision making purposes. An SDN Application typically includes one SDN Application Logic and one or more NBI Drivers. SDN Applications may themselves expose another layer of abstracted network control, thus offering one or more higher-level NBIs through respective NBI agents.

An SDN Controller is a logically centralized entity in charge of: (a) translating requirements from the SDN Application layer down to the SDN Datapaths, and (b) providing the SDN Applications with an abstract view of the network (which may include statistics and events). An SDN Controller typically includes one or more NBI Agents, the SDN Control Logic, and the Control to Data-Plane Interface (CDPI) driver.

An SDN Datapath is a logical network device that exposes visibility and control over its advertised forwarding and data processing capabilities. The logical representation may encompass all or a subset of the physical substrate resources. An SDN Datapath comprises a CDPI agent and a set of one or more traffic forwarding engines and zero or more traffic processing functions. These engines and functions may include simple forwarding between the datapath's external interfaces or internal traffic processing or termination functions. One or more SDN Datapaths may be contained in a single (physical) network element—an integrated physical combination of communications resources, managed as a unit. An SDN Datapath may also be defined across multiple physical network elements.

The SDN CDPI is the interface defined between an SDN Controller and an SDN Datapath, which typically provides: programmatic control of all forwarding operations, capabilities advertisement, statistics reporting, and event notification. Meanwhile, SDN NBIs are interfaces between SDN Applications and SDN Controllers and typically provide abstract network views and enable direct expression of network behavior and requirements. Generally speaking, the interfaces may be implemented in an open, vendor-neutral and interoperable way.

In various embodiments, an SDN may implement the OpenFlow (OF) protocol. The OF protocol is a communications protocol that enables network controllers to determine the path of network packets across a network of switches. Separation between control and forwarding allows for more sophisticated traffic management than is feasible using access control lists (ACLs) and conventional routing protocols. Also, OF allows switches from different vendors, each with their own proprietary interfaces and scripting languages, to be managed remotely using a single, open protocol.

The OF protocol is layered on top of the Transmission Control Protocol (TCP), and prescribes the use of Transport Layer Security (TLS). Moreover, OF allows remote administration of a layer 3 switch's packet forwarding tables, by adding, modifying and removing packet matching rules and actions. Routing decisions can be made periodically or ad hoc and translated into rules and actions with a configurable lifespan, which are then deployed to a switch's flow table, leaving the actual forwarding of matched packets to the switch at wire speed for the duration of those rules.

In various embodiments, an SDN employing the OF protocol may implement a number of security applications, for example, in an IoT environment. At a high level, an SDN controller may periodically collect network statistics from the forwarding plane of the network, and it may then apply classification algorithms on those statistics in order to detect any network anomalies. If an anomaly is detected, the SDN controller may reprogram the data plane in order to remediate or mitigate it.

As described in more detail below, systems and methods described herein may provide security to the Internet-of-Things (IoT) using SDN and network traffic analysis. Most IoT devices are low-powered with limited amount of computational resources. Therefore, enabling security measures at the device level, also taking in account the vast amount of devices in use, becomes unfeasible.

To address these, and other concerns, systems and methods described herein introduce an SDN-enabled controller that is referred to as "IoT Gateway Controller," and which may be connected to all the switches and Wi-Fi Routers to which the IoT devices are connected. Thus, any traffic before reaching the IoT device, passes through the IoT Gateway Controller. Concurrently, any network traffic or request coming from inside the network passes through the IoT Gateway Controller before it ultimately reaches an Internet Service Provider's (ISP's) server. As such, these systems and methods may enable the creation and maintenance of a secure virtual border in an otherwise borderless IoT network.

The IoT Gateway Controller may be equipped with Intrusion Detection System and antivirus engines to protect devices connected to it from various security threats and malware. When all network devices connected to the IoT Gateway Controller are SDN-capable, in the case of a threat detection, the corresponding preventive measure (e.g., IP blocking or rate limiting) may be sent to all the affected devices via a Flow Table rule. As soon as a new flow table entry is created, the SDN-enabled devices starts adhering to the preventive measure. Because the IoT devices are connected to the network via these switches and routers, they too get secured, thus protecting them from both inbound as well as outbound traffic.

All the network traffic finally reaches the ISP server, where a main SDN Controller may be installed. The main SDN Controller may be configured to sync all the IoT Gateway Controllers, update IDS (Intrusion Detection System) rules, and provide load balancing and/or fault tolerance. Since the IoT Controllers are in constant communication, the entire system makes sure that the security rules are updated on all IoT Gateway Controllers in real time, and can also incorporate traffic management and load balancing measures so as to provide optimum response time.

In various implementations, an IoT Gateway Controller may automatically reconfigure network devices, reroute traffic and apply authentication and access rules in order to address "Slow Denial-of-Service (DoS)" attacks.

A conventional Denial-of-Service (DoS) attack renders websites and other online resources unavailable to intended users by consuming all the network and the application server resources. That is, a DoS attack is a cyber-attack where the perpetrator seeks to make a machine or network resource unavailable to its intended users by temporarily or indefinitely disrupting services of a host connected to the Internet. This is typically accomplished by flooding the targeted machine or resource with superfluous requests in an attempt to overload systems and prevent some or all legitimate requests from being fulfilled.

In a "Slow DoS" attack, however, an attacker can penetrate a network by launching an HTTP request, which is not closed, thereby giving the attacker the opportunity to create multiple connections on the same server, as the server continues receiving bogus data from the attacker during the timeout period. By design, the HTTP protocol requires requests to be completely received by the server before they are processed. If an HTTP request is not complete, or if the transfer rate is very low, the server keeps its resources busy waiting for the rest of the data. If the server keeps too many resources busy, this creates a denial of service. In many cases, the attacker may occupy each and every connection available on that particular web server, which renders that server unavailable to fulfill legitimate requests. Unlike ordinary DoS attacks, attacks such as Slow HTTP Post or HTTP Get do not fill the bandwidth, but rather deplete application layer (web-server) resources (memory, CPU time). Consequently, existing DoS-attack detection systems are ineffective for detecting these attacks.

In some embodiments, an IoT Gateway Controller may analyze data collected from a Web Server's resource utilization, its request response timings, packet analyses of the TCP dump collected from OpenFlow switches, and it may block blocking the IP address of a client in the case of attack.

For example, historic data of the Web Server's resource utilization (memory, CPU time, etc.) and request response time is collected and thus a threshold value may be calculated. At any given point of time during the Server's uptime, if these values crosses the defined threshold value, a warning flag is set. Once warning flag is set to true, the server instructs the IoT Gateway Controller to collect the TCP dump of connected OpenFlow switches. This data, when received by the IoT Gateway Controller, is analyzed using a packet analysis tool.

Each type of Slow DoS attack has certain generic structure using which the attack occurs and exploits the vulnerability of TCP/IP. These attack definitions are present in the IoT Gateway Controller. Once confirmed that it is an attack and not a scenario wherein the server is genuinely experiencing heavy traffic, the IoT Gateway Controller sends an instruction to the OpenFlow switches via a Rest API call to modify their flow tables so as to block the IP addresses causing the attack.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a CPU or hardware or software control logic, Read-Only Memory (ROM), and/or other types of nonvolatile memory.

Additional components of an IHS may include one or more disk drives, one or more network ports for communicating with external devices as well as various input/output (I/O) devices, such as a keyboard, a mouse, a touchscreen, and/or a video display. An IHS may also include one or more buses operable to transmit communications between the various hardware components. An example of an IHS is described in more detail below.

FIG. 1 shows an example of an IHS configured to implement an IoT Gateway Controller according to some embodiments. As shown, IHS 5 includes main processor or CPU 10. Main processor 10 may be a processor, a microprocessor, minicomputer, or any other suitable processing device, including combinations and/or a plurality thereof, capable of or configured to execute program instructions. For example, execution of an algorithm or software configured to implement techniques described herein may occur, at least in part, within main processor 10.

Main processor 10 may be in data communication over a local interface bus 30 with a variety of components.

Examples of such components include, but are not limited to: memory 15, Input/Output (I/O) interface 40, network port or adaptor 45, disk drive 50, Basic Input/Output System (BIOS) 75, Embedded Controller (EC) 80, and video display adapter 35.

Memory 15, as illustrated, may include volatile memory 20 (e.g., random access memory or "RAM") and/or non-volatile memory 25. The IHS's Operating System and application programs may be loaded into RAM 20 for execution. As used herein, the term "OS" generally refers to a set of programs that control operations of the IHS and allocation of resources. An application program runs on top of the OS and uses computer resources made available through the OS to perform application specific tasks desired by a user.

Non-volatile memory 25 may include, but is not limited to, flash memory, non-volatile random access memory (NVRAM), or electrically erasable programmable read-only memory (EEPROM). In some cases, non-volatile memory 25 may contain firmware or the like, which may include persistent programming and/or executable instructions for managing certain aspects, devices, and/or components of IHS 5.

Input/Output (I/O) interface 40 is responsible for providing a number of I/O ports, including a keyboard port, a mouse port, a serial interface, a parallel port, etc. to IHS 5. As such, I/O interface 40 may be coupled to keyboard 60, mouse 65, and/or other I/O devices.

Network port or adaptor 45 enables communications over network 70, such as a local area network (LAN) or a wide area network (WAN), such as the Internet.

Disk drive 50 is a storage device where data is recorded persistently using various electronic, magnetic, optical, and/or mechanical techniques. Examples of disk drive 50 include a hard disk drive (HDD), a solid-state drive (SSD), a hybrid drive, an optical disc drive, etc.

Basic Input/Output System (BIOS) 75 is a type of firmware used during the booting process (reset or startup) of IHS 5 that contains the first software that is executed when IHS 5 is powered on. BIOS 75 includes BIOS program code containing the basic routines that help to start up IHS 5 and to transfer information between elements within IHS 5. In some implementations, BIOS 75 may include firmware compatible with the EFI Specification and Framework. In operation, BIOS 75 is configured to initialize and test the IHS's hardware components, and also to load a boot loader or an Operating System (OS) from a memory. In modern systems, BIOS 75 includes flash memory so it can be rewritten without having to physically remove the chip from IHS 5.

Embedded Controller (EC) 80 enables management of various components of IHS 5. For example, EC 80 may interface with a keyboard to accept end user inputs (e.g., via I/O interface 40), and it may provide many different system management functions, such as power management, thermal management, etc.

Video display adapter 35 includes a video card and/or video hardware integrated into the IHS's motherboard or CPU 10. Motherboard-based implementations are sometimes called "on-board video," while CPU-based implementations are known as Accelerated Processing Units (APUs). Many modern IHSs have motherboards with integrated graphics that also allow the disabling of the integrated graphics chip in BIOS 75, and have a PCI, or PCI Express (PCI-E) slot for adding a higher-performance graphics card in place of the integrated graphics. As such, video display adapter 35 may be used to feed video and images to display 55.

It should be appreciated that, in other embodiments, IHS 5 may comprise any device that executes software. Moreover, an IHS may not include all of the components shown in FIG. 1, may include other components that are not explicitly shown, or may utilize a different architecture.

Figure 2:
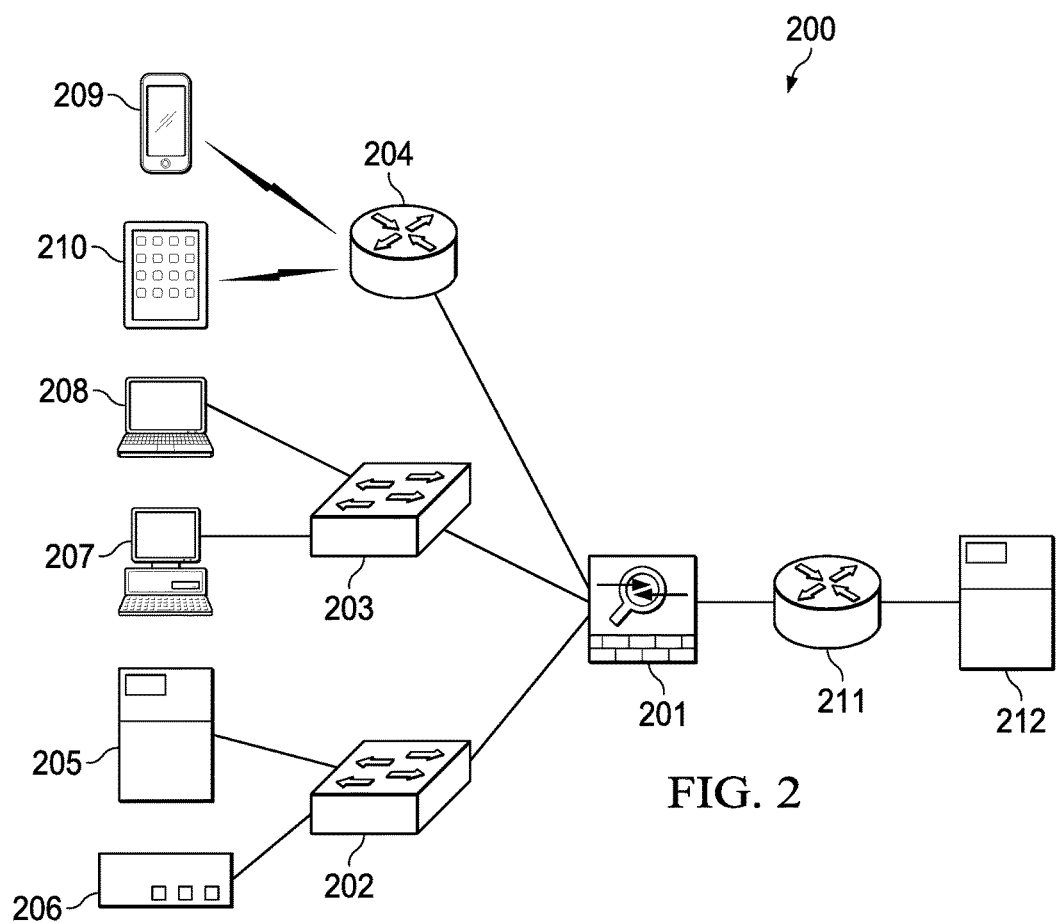
FIG. 2 is a diagram of an example of a factory, building, office, or home environment where systems and methods described herein may be implemented according to some embodiments.

FIG. 2 is a diagram of an example of a factory, building, office, or home environment where systems and methods described herein may be implemented according to some embodiments. Particularly, SDN network 200 includes IoT Gateway Controller 201 coupled to ISP server 212 via router 211. IoT Gateway Controller 201 is also coupled to Open-Flow (OF) switches 202 and 203, as well as wireless router 204.

Client devices 205 and 206 access ISP server 212 via OF switch 202, client devices 207 and 208 access ISP server 212 via OF switch 203, and client devices 209 and 210 access ISP server 212 via wireless router 204. In some embodiments, any of client devices 205-210 may include an IHS such as, for example, IHS 5 depicted in FIG. 1.

Additionally or alternatively, any of client devices 205-210 may be an IoT device, including legacy devices that lack one or more capabilities (e.g., processing power, memory space, security software, etc.) necessary for identifying a security threat. For example, a legacy sensor (e.g., a conventional temperature sensor, etc.) may be coupled to SDN network 200 via an adaptor or hub. The adaptor may be configured to receive commands over the network and to read an analog voltage or current signal output by the legacy sensor such that the legacy sensor is presented as an addressable device in the network. In the absence of such an adaptor, however, the legacy sensor may not have any digital processing or networking capabilities.

In this example, IoT Gateway Controller 201 resides on the network gateway of the environment whose IoT devices needs to be secured. The IoT devices dispersed across the area are connected to various switches and routers, which are then connected to IoT Gateway Controller 201. Because all the network traffic may be first analyzed at IoT Gateway Controller 201 via a rules engine (e.g., both via IDS as well as the antivirus engine), any anomaly is detected there, and the source IP which is the cause of that threat may be updated at all the switches and the routers connected to IoT Gateway Controller 201.

In various implementations, each switch and Wi-Fi router connecting IoT devices are SDN-enabled and adhere to the OpenFlow Protocol, such that their respective flow tables may be dynamically updated by IoT Gateway Controller 201. Appropriate remedial action, such as in IP blocking, port blocking, and/or traffic rate limiting may be updated via modified flow tables, thus making sure that all IoT devices connected are safe from intrusions and malware.

Figure 3:
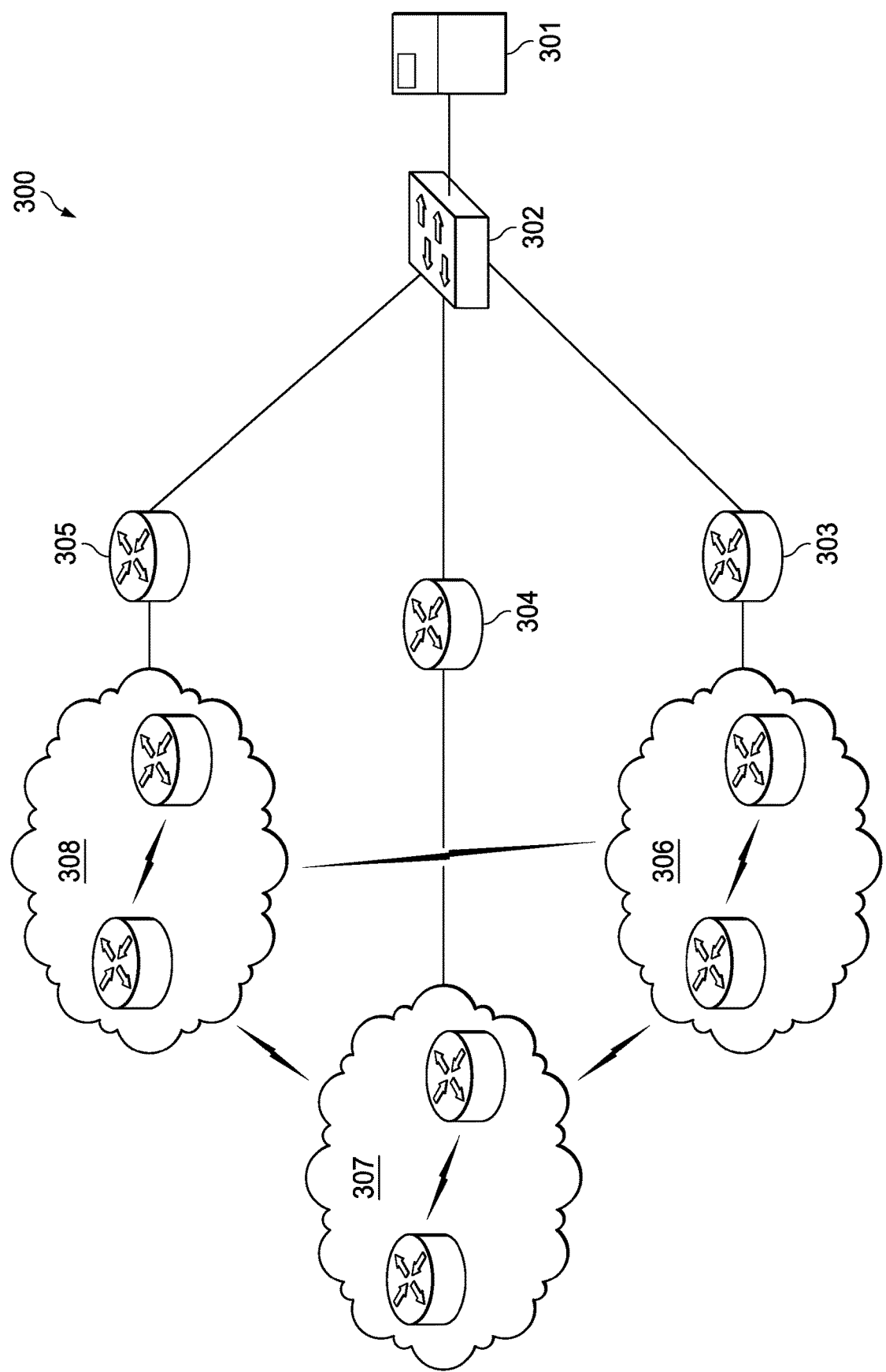
FIG. 3 is a diagram of an example of a zone-based environment where systems and methods described herein may be implemented according to some embodiments.

FIG. 3 is a diagram of an example of a zone-based environment where systems and methods described herein may be implemented according to some embodiments. In this example, main SDN Controller 301 is coupled to OF switch 302, which is turn is coupled to routers 303-305. Zones 306-308 are three different areas in which a city or building, for instance, may be divided, each defined by a set geographical or physical area (e.g., a building's floor or section) and/or the number of network devices present in each one of them.

Each of zones 306-308 may include its own IoT Gateway Controller 201, which sends the packet to the next router (outbound traffic) or to the OF switch to which a particular IoT device is connected to (inbound traffic) based upon its security policies and rules. These IoT Gateway Controllers are in constant communication with each other via Main SDN Controller 301, which not only updates the latest security definitions and rules to all of them, so as to create a secure environment throughout the network, but also is responsible for load balancing and fault tolerance amongst the different IoT Gateway Controllers.

Figure 4:
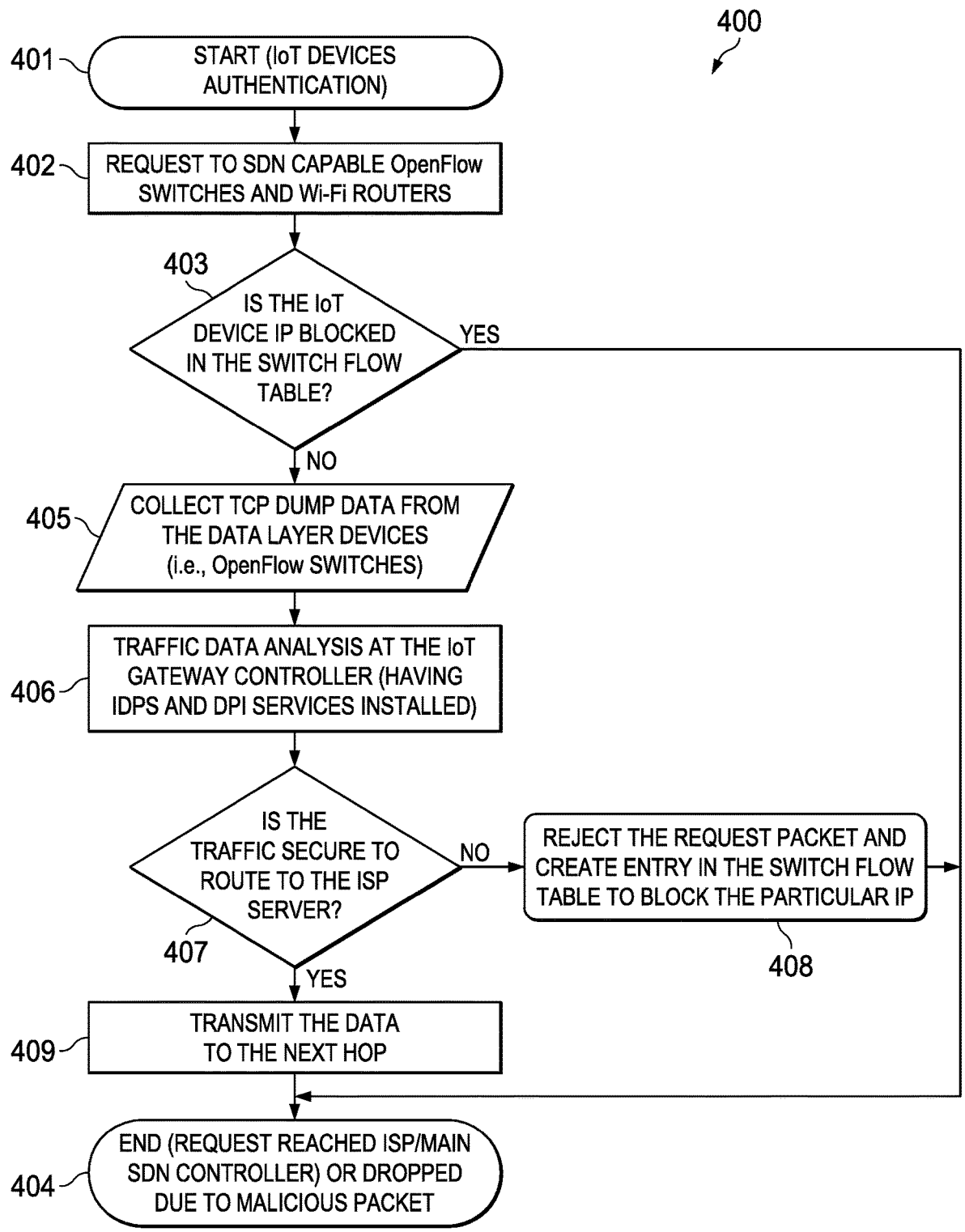
FIG. 4 is a flowchart of an example of a method for processing outbound traffic according to some embodiments.
Figure 5:
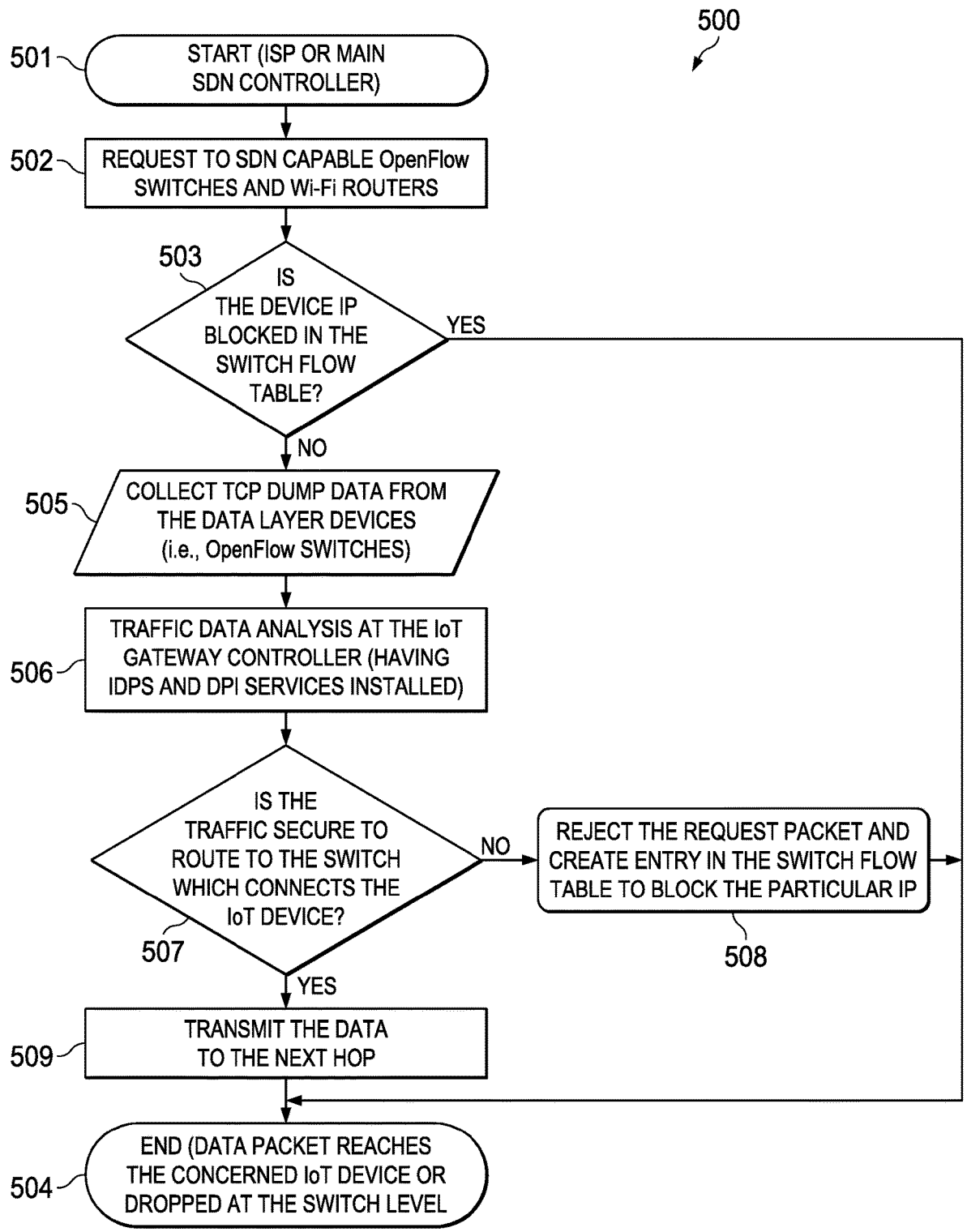
FIG. 5 is a flowchart of an example of a method for processing inbound traffic according to some embodiments.

To better illustrate the foregoing techniques, FIGS. 4 and 5 show examples of methods 400 and 500 for processing outbound traffic and inbound traffic, respectively, according to some implementations, methods 400 and/or 500 may be performed, for example, by IoT Gateway Controller 201 under execution of program instructions stored in memory 15.

Method 400 starts at block 401, where IoT devices are authenticated or provisioned. At block 402, method 400 includes sending request(s) to SDN-capable OF switches and/or routers. At block 403, method 400 may include determining whether the IoT device's IP address is blocked in the switch's flow table. If so, block 404 drops the packet due to it being found to be malicious.

Otherwise block 405 collects TCP dump data from the data layer devices (e.g., OF switches). Block 406 performs traffic data analysis at the IoT Gateway Controller when configured with intrusion detection and/or deep packet inspection (IDPS and/or DPI) services. Block 407 then determines whether the traffic is safe to route to the ISP server. If not, block 408 rejects the packet and creates a new entry in the switch flow table to block that particular IP before method 400 ends at block 404. If so, block 409 transmits the data or packet to the next hop in the SDN network before method 400 again ends at block 404.

Method 500 mirrors the operations of method 400, but this time for inbound traffic. Specifically, method 500 starts at block 501. At block 502, method 500 includes sending request(s) to SDN-capable OF switches and/or routers. At block 503, method 500 may include determining whether the IoT device's IP address is blocked in the switch's flow table. If so, block 504 drops the packet due to it being found to be malicious.

Block 505 collects TCP dump data from the data layer devices. Block 406 performs traffic data analysis at the IoT Gateway Controller when configured with IDPS and/or DPI services. Block 407 then determines whether the traffic is safe to route to the switch that connects to the IoT device. If not, block 508 rejects the packet and creates a new entry in the switch flow table to block that particular IP before method 500 ends at block 504. If so, block 509 transmits the data or packet to the next hop in the SDN network before method 500 again ends at block 504.

In sum, methods 400 and 500 cover both inbound and outbound network traffic, thus making sure that the devices are safe from any internal as well as an external attack. In a normal scenario, these switches are directly connected to the router, which then forwards the traffic to the next router and so on till it reaches the ISP gateway, once reached, the traffic is routed to the specific DNS server which can service the request of the particular device.

Use of SDNs in this type of architecture moves the decision making and the analyses to an IoT Gateway Controller, which is dedicated to a particular zone and can take appropriate actions to keep the system secured in real time. Therefore, even for the resource constrained devices such as sensor nodes, there is no overhead of any kind of computation, since that is entirely shifted on the network layer, thus securing the same.

Figure 6:
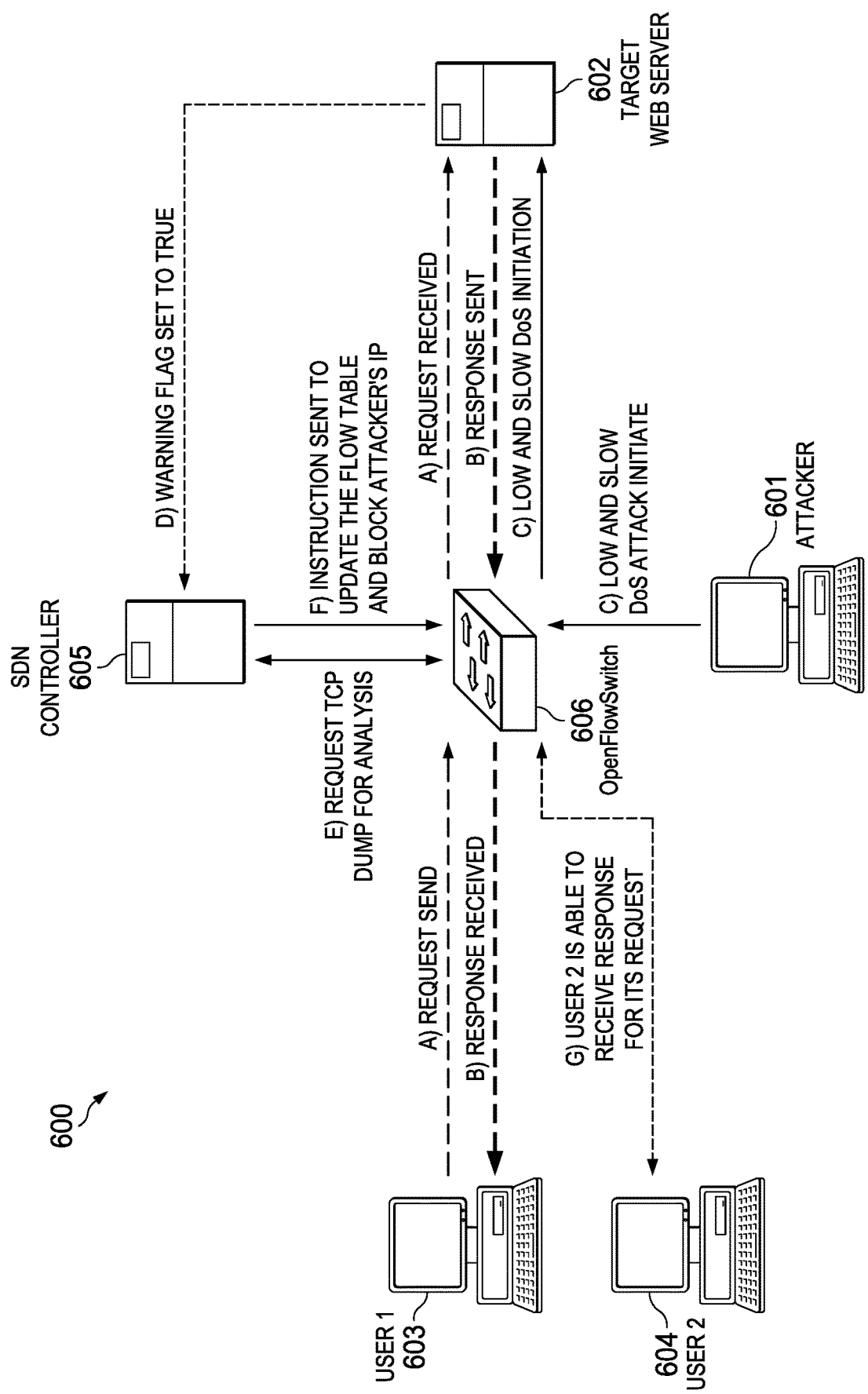
FIG. 6 is a diagram of an example of a system configured to handle Slow Denial-of-Service (DoS) attacks according to some embodiments.

FIG. 6 is a diagram of an example of a system configured to handle Slow DoS attacks according to some embodiments. In this example, client 603 sends a request "A" to Target Web Server 602 through OF switch 606, and web server 602 provides a response "B" back to client 603. Then, client 601 initiates a Slow DoS attack "C" against target web server 602.

Once web server 602 sets a warning flag "D" to true, IoT Gateway Controller 605 requests and receives a TCP dump "E" from OF switch 605 and, after processing the data, sends an instruction "F" to OF switch 606 to update its flow table and block the IP address of client 601. Thereafter, client 604 is able to receive responses to its requests "G" directed at web server 602.

In the above scenario, once the warning flag once set to true, it is used to initiate a network data analysis request. The IoT Gateway Controller looks for similarity in patterns between any generic rule(s) established previously and the data captured from the OF Switch. For example, to identify a Slow DoS attack, consider a sample HTTP Post attack. The initial phase of attack is the successful TCP connection of the attacker with the Web Server.

Once the TCP connection gets established, the attackers sends an incomplete post request with a content header length, and gets acknowledged. Now, the subsequent post requests are sent at a very slow rate, keeping the connection open for a very long time. Multiple such concurrent connections are made by the client, thereby exhausting all the resources of the target server.

We are also able to witness an increase in the response time of the requests, and resource utilizations of the target server and/or other IoT devices, from the beginning of the attack. Thus, a rule is formed taking into account both the pattern of the requests captured in the TCP dump, and the resource utilization (e.g., processor cores, memory, etc.) and response time statistics (e.g., average HTTP response) of the server and/or other IoT device. Once an attack is confirmed by the IoT Gateway Controller, instruction to modify the flow table of the corresponding switches is sent via a REST API to block the attacking IP.

Figure 7:
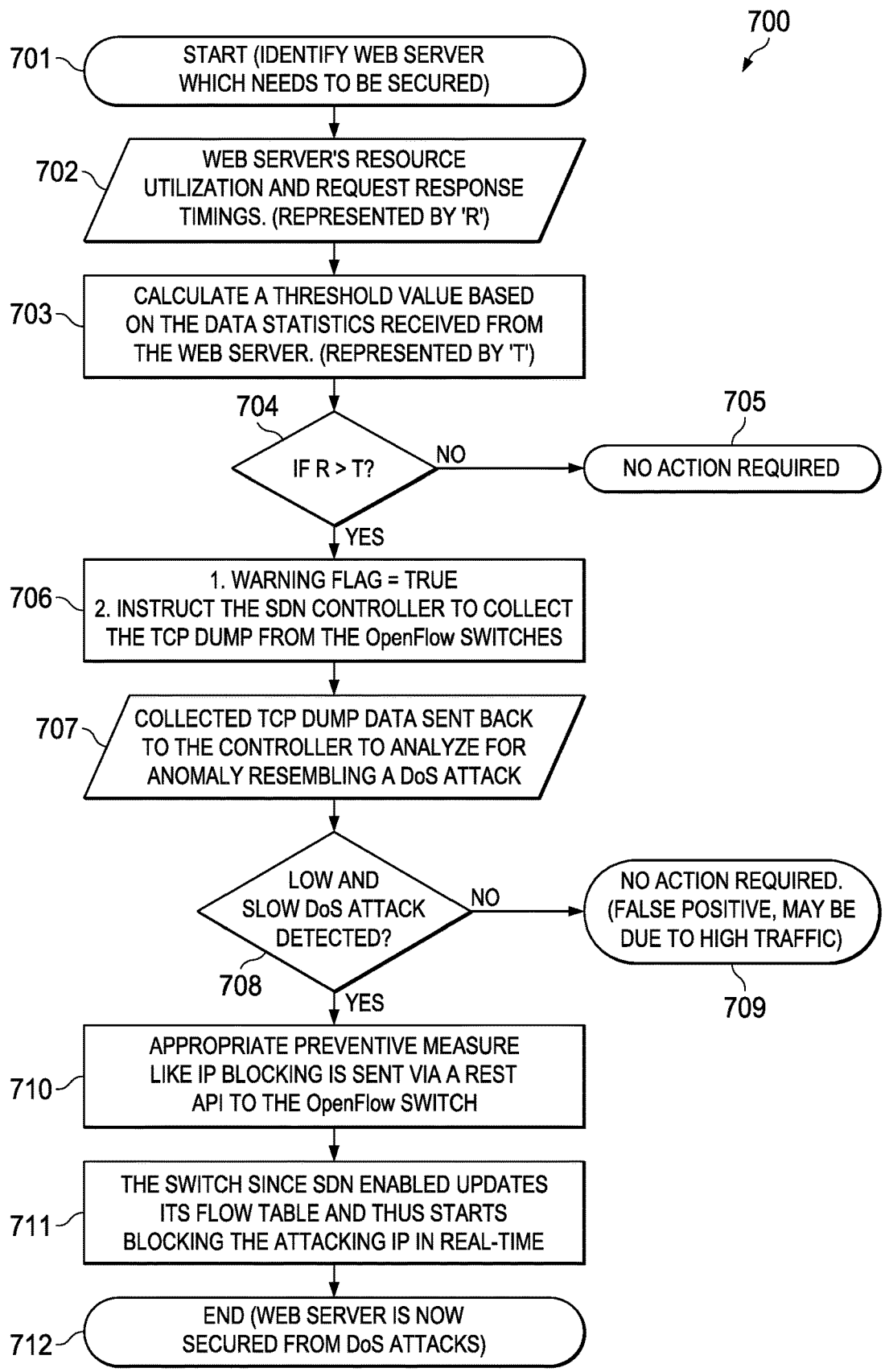
FIG. 7 is a flowchart of an example of a method for handling Slow DoS attacks according to some embodiments.

FIG. 7 is a flowchart of an example of a method for handling Slow DoS attacks according to some embodiments. In some implementations, methods 400 and/or 500 may be performed, at least in part, by IoT Gateway Controller 201 under execution of program instructions stored in memory 15.

Method 700 starts at block 701, where a web server to be secured is identified (e.g., using flag warning "D"). At block 702, method 700 may include collecting the web server's resource utilization and/or request response timings (represented by "R"). At block 703, method 700 may include calculating one or more threshold value(s) based on data statistics received from the web server (represented by "T"). At block 704, method 700 determines whether R is greater than T. If not, then block 705 takes no action. Conversely, if R is greater than T, then block 706 sets the warning flag to true and instructs the IoT Gateway Controller to collect the TCP dump from an OF switch.

In some cases, resource utilization and/or request response timings may each be weighed, and their weighted average calculated. Accordingly, the determination of whether R is greater than T may take both resource utilization and/or request response timings into account at the same time. Weights may be manually selected by an administrator based upon historical traffic data, and/or may be dynamically adjusted during execution of method 700 to reflect the dynamic nature of IoT network environments and architectures (when compared with traditional IHS networks).

In some implementations, operations 701-706 may be performed by the web server, periodically or upon detection of a configurable event. In other cases, however, operations 701-706 may be performed by a client IoT device, for example, to identify a Slow DoS attack launched from and/or against the IoT device itself, and/or the web server. For instance, one or more threshold values may include a number of request/response timeouts and/or the resource utilization of the client IoT device making or receiving those requests. Thus, even in the case of a legacy IoT device or sensor (that would not otherwise be subject to network attacks save for the presence of an adaptor or hub connecting it to the IoT network), a Slow DoS attack aimed toward the legacy device's IP address (assigned by the adaptor) can be mitigated.

At block 708, IoT Gateway Controller detects or confirms whether a Slow DoT attack is underway, for example, by examining HTTP packets received as part of the TCP dump from the OF switch, as described above. If the attack is not detected, block 709 ends method 700. If the attack is detected, however, block 710 takes appropriate preventive or remedial action, for example, by sending an IP blocking command via a REST API to the OF switch.

At block 711, the OF switch, which is SDN-capable, updates its flow table and starts blocking the IP address of the attacking device in real time. At block 712, method 700 ends with the web server being safe from the DoS attack.

As described above, successful detection of a Slow DoS attacks may be seen as a three-stage process that operate at the network layer itself using SDN, thereby making sure the victim's server is completely secured. In a first stage, the server to be protected is identified and its resource utilization and response time statistics are collected. This data is then used to calculate a threshold value. If at any given point of time during the server's uptime, the value crosses the defined threshold value, a warning flag is set.

In a second stage, once warning flag is set to true, the TCP dump of the OF switches connected to the sever is sent to the IoT Gateway or SDN Controller for further analysis. This analysis confirms if it is a real attack or a false positive generated because of exceptionally high traffic at the server. In stage three, if confirmed after the analysis (using the attack definitions present with the SDN controller), that it is a genuine attack, an instruction is sent to all the connected OF Switches (using a REST API) to update their flow tables and block the attacking IP, thus, protecting the server from additional attack attempts.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
    one or more processors; and
    a memory coupled to the one or more processors, the memory having program instructions stored thereon that, upon execution by the one or more processors, cause the IHS to:
    receive traffic in a Software-Defined Network (SDN) network;
    identify, based upon the received traffic, a security threat as a slow Denial-of-Service (DoS) attack targeting a legacy hardware device coupled to the SDN via a hub or adaptor by:
        (i) multiplying a number of response timeouts by a first weight to calculate a first metric,
        (ii) multiplying a resource utilization by a second weight to calculate a second metric,
        (iii) calculating a weighted average (R) of the first and second metrics, and
        (iv) determining that the weighted average (R) is greater than a threshold (T); and
    initiate a remediation measure with respect to the security threat,
    wherein the remediation measure comprises Internet Protocol (IP) blocking, port blocking, or traffic rate limiting.

2. The IHS of claim 1, wherein the legacy hardware device lacks one or more capabilities necessary for identifying or remediating the security threat, and wherein the capabilities are selected from the group consisting of: processing power, memory space, and security software.

3. The IHS of claim 2, wherein to receive the traffic, the program instructions, upon execution by the one or more processors, further cause the IHS to receive Transmission Control Protocol (TCP) data from an SDN-capable switch or router.

4. The HIS of claim 1, wherein to initiate the remediation measure, the program instructions, upon execution by the one or more processors, further cause the HIS to update one or more entries in a flow table used by the SDN-capable switch or router.

5. The IHS of claim 4, wherein to update the one or more entries in the flow table, the program instructions, upon execution by the one or more processors, further cause the IHS to use a representational state transfer (REST) Application Programming Interface (API).

6. The IHS of claim 3, wherein the program instructions, upon execution by the one or more processors, further cause the IHS to receive a definition of the security threat from a main IoT Gateway Controller in the SDN network.

7. The IHS of claim 3, wherein the IoT device comprises an analog sensor coupled to the SDN network via an adaptor or hub and wherein the plurality of requests comprise requests for the adaptor or hub to transmit, to the server, an indication of an analog voltage or current signal read by the analog sensor.

8. A hardware memory device having program instructions stored thereon that, upon execution by an Information Handling System (IHS), cause the IHS to:
  receive traffic in a Software-Defined Network (SDN) network, wherein at least a portion of the traffic is directed to or originated from an of Internet-of-Things (IoT) device, wherein the IoT device lacks one or more capabilities necessary for identifying the security threat, and wherein the capabilities are selected from the group consisting of: processing power, memory space, and security software;
  identify a security threat as a slow Denial-of-Service (DoS) attack based upon the received traffic by:
    (i) multiplying a number of response timeouts by a first weight to calculate a first metric,
    (ii) multiplying a resource utilization by a second weight to calculate a second metric,
    (iii) calculating a weighted average (R) of the first and second metrics, and
    (iv) determining that the weighted average (R) is greater than a threshold (T); and
  initiate a remediation measure with respect to the security threat,
  wherein the remediation measure comprises Internet Protocol (IP) blocking, port blocking, or traffic rate limiting.

9. The hardware memory device of claim 8, wherein to receive the traffic, the program instructions, upon execution by the IHS, further cause the IHS to receive Transmission Control Protocol (TCP) data from an SDN-capable switch or router.

10. The hardware memory device of claim 8, wherein to initiate the remediation measure, the program instructions, upon execution by the one or more processors, further cause the IHS to update one or more entries in a flow table used by the SDN-capable switch or router.

11. A method, comprising:
  receiving Transmission Control Protocol (TCP) data in a Software-Defined Network (SDN) network from an SDN-capable switch or router, wherein at least a portion of the traffic is directed to a server and originated from an of Internet-of-Things (IoT) device;
  identifying a security threat as a slow Denial-of-Service (DoS) based upon the received traffic by:
    (i) multiplying a number of response timeouts by a first weight to calculate a first metric,
    (ii) multiplying a resource utilization by a second weight to calculate a second metric,
    (iii) calculating a weighted average (R) of the first and second metrics, and
    (iv) determining that the weighted average (R) is greater than a threshold (T); and
  initiating a remediation measure with respect to the security threat,
  wherein the remediation measure comprises Internet Protocol (IP) blocking, port blocking, or traffic rate limiting.

12. The method of claim 11, wherein initiating the remediation measure comprises updating one or more entries in a flow table used by the SDN-capable switch or router.

* * * * *